United States Patent
Lee et al.

(10) Patent No.: US 8,385,167 B2
(45) Date of Patent: *Feb. 26, 2013

(54) INFORMATION STORAGE MEDIUM AND METHOD AND APPARATUS FOR RECORDING/REPRODUCING DATA ON/FROM THE SAME

(75) Inventors: Kyung-geun Lee, Seongnam-si (KR); Wook-yeon Hwang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 118 days.

This patent is subject to a terminal disclaimer.

(21) Appl. No.: 11/431,004

(22) Filed: May 10, 2006

(65) Prior Publication Data
US 2006/0227689 A1 Oct. 12, 2006

Related U.S. Application Data

(63) Continuation of application No. 11/012,185, filed on Dec. 16, 2004.

(30) Foreign Application Priority Data

Apr. 27, 2004 (KR) .................. 2004-29187

(51) Int. Cl.
*G11B 7/00* (2006.01)
(52) U.S. Cl. .................. 369/47.53; 369/59.25; 369/94; 369/275.3
(58) Field of Classification Search .................. 369/94, 369/59.25, 275.3, 47.53, 283
See application file for complete search history.

(56) References Cited

U.S. PATENT DOCUMENTS

| | | | |
|---|---|---|---|
| 5,255,007 A | 10/1993 | Bakx | |
| 5,881,032 A * | 3/1999 | Ito et al. | 369/30.1 |
| 5,914,917 A * | 6/1999 | Bae | 369/30.09 |
| 6,707,776 B2 | 3/2004 | Nagata et al. | |
| 7,158,466 B2 * | 1/2007 | Tanaka | 369/94 |
| 7,177,256 B2 * | 2/2007 | Motohashi | 369/59.25 |
| 7,263,044 B2 | 8/2007 | Lee et al. | |
| 7,304,929 B2 * | 12/2007 | Ninomiya | 369/47.53 |
| 2002/0064110 A1 * | 5/2002 | Sato | 369/47.53 |
| 2002/0136122 A1 * | 9/2002 | Nakano | 369/47.53 |
| 2002/0172113 A1 * | 11/2002 | Hirokane et al. | 369/47.51 |

(Continued)

FOREIGN PATENT DOCUMENTS

| | | |
|---|---|---|
| CN | 1447968 | 10/2003 |
| EP | 1 244 096 | 9/2002 |

(Continued)

OTHER PUBLICATIONS

Search Report and Written Opinion issued in International Patent Application No. PCT/KR2005/001198 on Aug. 8, 2005.

(Continued)

*Primary Examiner* — Wayne Young
*Assistant Examiner* — Linh N Hoffner
(74) *Attorney, Agent, or Firm* — NSIP Law

(57) ABSTRACT

A method of reproducing data from an information storage medium having a plurality of recording layers, each layer having a user data area, on which data is recordable by a pickup. A first amount of data is reproduced from a recording layer located closest to the pickup and lesser amounts of data than the first amount of data are reproduced from other ones of the plurality of recording layers. The amount of data reproduced from each of the other ones of the plurality of recording layers progressively decreases from the recording layer closest to the pickup to a recording layer farthest from the pickup.

6 Claims, 4 Drawing Sheets

U.S. PATENT DOCUMENTS

| | | | |
|---|---|---|---|
| 2002/0186637 A1* | 12/2002 | Van Woudenberg et al. | 369/59.25 |
| 2003/0067859 A1 | 4/2003 | Weijenbergh et al. | |
| 2003/0117922 A1* | 6/2003 | Park | 369/53.24 |
| 2003/0137909 A1 | 7/2003 | Ito et al. | |
| 2003/0137915 A1* | 7/2003 | Shoji et al. | 369/59.25 |
| 2003/0185121 A1 | 10/2003 | Narumi et al. | 369/47.53 |
| 2004/0110086 A1 | 6/2004 | Kakiuchi et al. | |
| 2004/0152016 A1 | 8/2004 | Mishima et al. | |
| 2004/0264322 A1 | 12/2004 | Shishido et al. | |
| 2005/0007924 A1 | 1/2005 | Nishiuchi et al. | |
| 2005/0013223 A1 | 1/2005 | Lee | |
| 2005/0117481 A1* | 6/2005 | Akiyama et al. | 369/47.53 |
| 2005/0207262 A1 | 9/2005 | Terada et al. | 365/232 |
| 2005/0226116 A1* | 10/2005 | Kubo et al. | 369/47.53 |
| 2005/0259552 A1* | 11/2005 | Miura et al. | 369/94 |
| 2005/0276187 A1 | 12/2005 | Lee et al. | |

FOREIGN PATENT DOCUMENTS

| | | |
|---|---|---|
| EP | 1 258 868 | 11/2002 |
| EP | 1 318 509 | 6/2003 |
| JP | 2002-216361 A | 8/2002 |
| JP | 2004-247024 | 9/2004 |
| JP | 2004-280865 | 10/2004 |
| JP | 2004-342217 | 12/2004 |
| RU | 2 060 563 | 5/1996 |
| TW | 200307929 | 12/2003 |
| WO | WO 02/23542 | 3/2002 |

OTHER PUBLICATIONS

U.S. Appl. No. 11/012,185, filed Dec. 16, 2004, Kyung-geun Lee et al, Samsung Electronics Co., Ltd.

U.S. Appl. No. 11/205,009, filed Aug. 17, 2005, Kyung-geun Lee et al, Samsung Electronics Co., Ltd.

U.S. Appl. No. 11/430,874, filed May 10, 2006, Kyung-geun Lee et al, Samsung Electronics Co., Ltd.

U.S. Appl. No. 11/431,003, filed May 10, 2006, Kyung-geun Lee et al, Samsung Electronics Co., Ltd.

Decision on Grant issued on May 30, 2008, in Russian Patent Application No. 2006141644 (in Russian with complete English translation).

First Office Action issued on Jun. 6, 2008, in Chinese Patent Application No. 2005800135277 (in Chinese with complete English translation).

Supplementary European Search Report issued on Jul. 10, 2008, in European Patent Application No. 05740832.0 (in English).

Taiwanese Patent Laid-Open Gazette issued Dec. 16, 2003.

Taiwanese Office Action issued on Oct. 13, 2008, in Taiwanese Application No. 094108561 (in Chinese with complete English translation) (27 pages).

Taiwanese Office Action issued on Apr. 10, 2009, in Taiwanese Application No. 094108561 (in Chinese with complete English translation) (18 pages).

Malaysian Office Action issued on May 29, 2009, in Malaysian Application No. PI 20051306 (in English) (3 pages).

Japanese Office Action issued on Jan. 4, 2011, in counterpart Japanese Application No. 2007-510618 (6 pages, in Japanese, including complete English translation).

Office Action issued on Jul. 11, 2011, in counterpart Canadian Patent Application No. 2564793 (5 pages, in English).

* cited by examiner

INFORMATION STORAGE MEDIUM AND METHOD AND APPARATUS FOR RECORDING/REPRODUCING DATA ON/FROM THE SAME

CROSS-REFERENCE TO RELATED APPLICATIONS

This application is a continuation of application Ser. No. 11/012,185 filed on Dec. 16, 2004, now pending, which claims the benefit of Korean Patent Application No. 2004-29187 filed on Apr. 27, 2004, in the Korean Intellectual Property Office, the disclosures of which are incorporated herein by reference.

BACKGROUND OF THE INVENTION

1. Field of the Invention

The present invention relates to an information storage medium and a method of and an apparatus for recording/reproducing data on/from the information storage medium. More particularly, the present invention relates to an information storage medium with a plurality of recording layers and which is designed to maintain the same recording/reproducing characteristics between the plurality of recording layers, each layer having recordable regions in a user data area and an optimum power control (OPC) area for performing a test to determine an optimum recording power, and a method of and an apparatus for recording/reproducing data on/from the information storage medium.

2. Description of the Related Art

An optical pickup performs non-contact recording/reproducing to/from an information storage medium. Optical disks that are one type of information storage media are classified into compact disks (CDs) and digital versatile disks (DVDs) depending on data recording capacity. Examples of optical disks capable of writing and reading information include CD-Recordable (CD-R), CD-Rewritable (CD-RW), and 4.7 GB DVD+RW. Furthermore, a high definition-DVD (HD-DVD) or blu-ray disk (BD) with recording capacity of over 15 GB and a super-resolution optical disk that can read data recorded in a pattern of marks below the resolution limit are currently being developed.

While only single layer 4.7 GB DVD-Recordable discs are commercially available, dual layer 8.5 GB DVD-ROM discs are being sold in the market. To back up data recorded on the 8.5 GB DVD-ROM disc, a DVD-Recordable disc with the 8.5 GB capacity is required. Thus, there is a need for a recordable disc having at least first and second recording layers.

When recording data on a recordable disc with first and second recording layers, the first recording layer must maintain the same recording/reproducing characteristics as the second recording layer in order to improve recording/reproducing performance. That is, variations in recording/reproducing characteristics depending on the recording sequence may adversely affect the recording/reproducing by a drive. Thus, there is a need for methods of maintaining the same recording/reproducing characteristics between a plurality of recording layers.

SUMMARY OF THE INVENTION

The present invention provides a method of and an apparatus for recording/reproducing data on/from a recordable information storage medium having a plurality of recording layers such that each recording layer has the same recording/reproducing characteristics and an information storage medium on which data is recorded by the same method and apparatus.

According to an aspect of the present invention, there is provided an information storage medium including a plurality of recording layers, each having a user data area, on which data is recordable by a pickup. In the information storage medium, data is recorded in the order of recording layers from closest to farthest from the pickup, and a recordable region in a user data area of a recording layer on which data is being recorded is smaller than a recordable region in a recording layer between the pickup and the recording layer on which data is being recorded.

In another embodiment, the present invention provides an information storage medium including a plurality of recording layers, each having an optimum power control (OPC) area for performing a test in order to determine an optimum recording power, on which data is recordable by a pickup.

In the information storage medium, data is recorded in the order of recording layers from closest to farthest from the pickup, and a recordable region in an OPC area of a recording layer on which data is being recorded is smaller than that in a recording layer between the pickup and the recording layer on which data is being recorded.

The recording layer includes unrecorded regions on the inner and outer circumferences of a user data area, wherein each unrecorded region corresponds to about half the number of tracks contained in a recording beam passing through the outer layer.

$$\text{Number of unrecorded tracks} = \frac{SL\tan\left[\sin^{-1}\left(\frac{NA}{n}\right)\right]}{TP}$$

where the unrecorded region contains the number of tracks, and SL, TP, NA, and n denote the thickness of a spacer layer between the plurality of recording layers, a track pitch, a numerical aperture of an objective lens, and a refractive index of the information storage medium, respectively. The size of a recorded region of each of the plurality of recording layers may decrease as a recording layer moves farther away from the pickup.

According to another aspect of the present invention, there is provided a method for recording/reproducing data on a recordable information storage medium with a plurality of recording layers using a pickup.

In another embodiment, the present invention provides a method for recording/reproducing data on a recordable information storage medium including a plurality of recording layers using a pickup, each recording layer having an optimum power control (OPC) area for performing a test in order to determine optimum recording power. The method includes the steps of recording data on a recording layer located closest to the pickup and recording data whose capacity decreases in the order of recording layers from closest to farthest from the pickup.

According to another aspect of the present invention, there is provided an apparatus for recording/reproducing data on/from a recordable information storage medium including a plurality of recording layers. The apparatus includes: a pickup that irradiates a beam onto the information storage medium; a recording/reproducing signal processor that receives a beam reflected from the information storage medium through the pickup for signal processing; and a controller that controls the pickup to record data in the order of recording layers from closest to farthest from the pickup and not to record data on predetermined regions located on the inner and outer circumferences of a user data area of a recording layer on which data is being recorded except a recording layer closest to the pickup.

In another embodiment, the present invention provides an apparatus for recording/reproducing data on/from a recordable information storage medium including a plurality of recording layers, each recording layer having an optimum power control (OPC) area for performing a test in order to determine optimum recording power. The apparatus includes: a pickup that irradiates a beam onto the information storage medium; a recording/reproducing signal processor that receives a beam reflected from the information storage medium through the pickup for signal processing; and a controller that controls the pickup to record data in the order of recording layers from closest to farthest from the pickup and not to record data on predetermined regions located on the inner and outer circumferences of an OPC area of a recording layer on which data is being recorded except a recording layer closest to the pickup.

Additional aspects and/or advantages of the invention will be set forth in part in the description which follows and, in part, will be obvious from the description, or may be learned by practice of the invention.

BRIEF DESCRIPTION OF THE DRAWINGS

The above and other features and/or other aspects and advantages of the present invention will become more apparent and more readily appreciated from the following description of the embodiments taken in conjunction with the accompanying drawings in which.

DETAILED DESCRIPTION OF THE PREFERRED EMBODIMENTS

Figure 1:
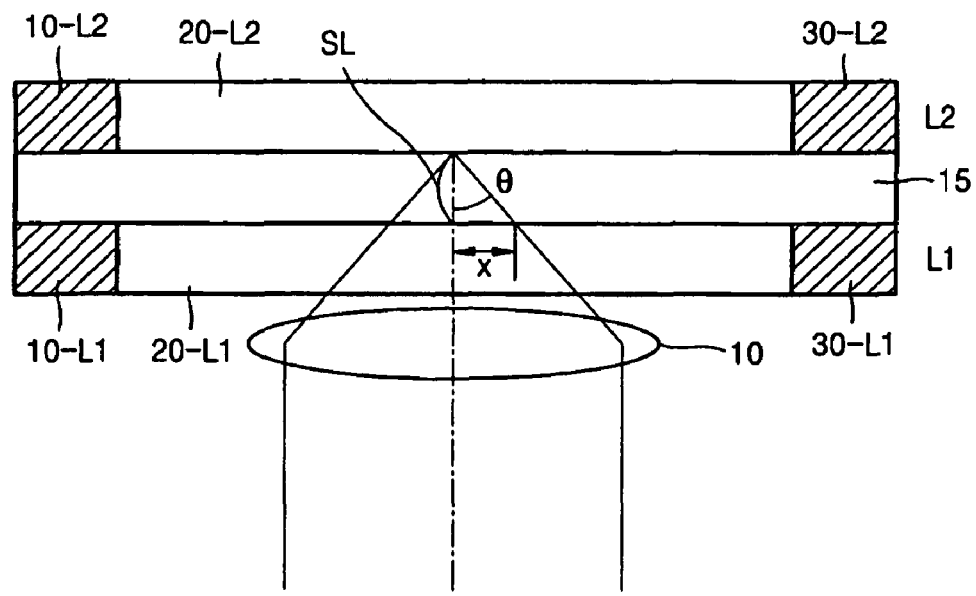
FIG. 1 illustrates a layout of a dual layer information storage medium for explaining a method of recording/reproducing data on/from an information storage medium according to the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

A method of recording/reproducing data on/from an information storage medium having a plurality of recording layers according to the present invention allows data to be prerecorded on a portion of another recording layer through which a recording beam passes when irradiating a target recording layer with the beam to record the data.

A recordable information storage medium performs optimum power control (OPC) prior to recording data in order to find the optimal recording power. To perform OPC, data is written in an OPC area at a predetermined recording power and read back to test the reproducing characteristics. Before performing OPC, data is recorded on a region through which a beam for OPC passes.

When OPC is implemented in a recordable information storage medium having a plurality of recording layers, recording/reproducing characteristics after recording data may vary from one recording layer to another, for example, depending on the recording sequence or recording power. Since these variations may lead to inaccuracy in OPC, it is necessary to detect conditions that may cause recording/reproducing characteristics to change depending on the state of each recording layer and perform OPC considering the detected conditions.

To find conditions that affect the data recording/reproducing characteristics, experiments were made to write data on an information storage medium having first and second recording layers L1 and L2 as shown in FIG. 1 in a different order and at different recording power levels.

Recording conditions of the information storage medium are a linear velocity of 3.8 m/s, laser wavelength of 650 nm, and objective lens numerical aperture (NA) of 0.60. The information storage medium uses multipulse. That is, while recording power of 15.1 mW, Ttop of 1.45 T, Tmp of 0.65 T, and Tdtp 3 T of −0.03 T are used for the first recording layer L1, recording power of 20 mW, Ttop of 1.65 T, Tmp of 0.70 T, Tdtp 3 T of −0.03 T are used for the second recording layer L2. Ttop, Tmp, and Tdtp denote the duration of a top pulse, the duration of each pulse in the multipulse train, and time shifted from reference, respectively. A negative sign (−) in Tdtp means Tdtp is shifted to the left. Here, basic recording conditions are set as recording power and write strategy adjusted for minimum jitter by writing data only on a desired recording layer, and 1 T denotes 38.5 ns.

Table 1 shows jitters, I3/I14 (modulations), asymmetries, and reflectivities measured after writing data on the first and second recording layers L1 and L2 under the above-mentioned conditions. As shown in FIG. 1, a pickup is located closer to the first recording layer L1, and reference numeral 10 denotes an objective lens.

TABLE 1

| Recording state | First recording layer (L1) | | | | Second recording layer (L2) | | | | Recording state |
|---|---|---|---|---|---|---|---|---|---|
| | Jitter | I3/I14 | Asymmetry | Reflectivity | Jitter | I3/I14 | Asymmetry | Reflectivity | |
| L1 unrecorded, L2 recorded | 7.9% | 0.270 | 0.085 | 17.0% | 8.1% | 0.255 | 0.030 | 17.5% | L1 unrecorded, L2 recorded |
| Recording L2 after recording L1 | 8.0% | 0.250 | 0.098 | 16.8% | 8.3% | 0.240 | 0.023 | 18.9% | Recording L1 after recording L2 |
| Recording L1 after recording L2 | 8.1% | 0.267 | 0.091 | 16.5% | 8.9% | 0.244 | 0.060 | 18.8% | Recording L2 after recording L1 |

As is evident from Table 1, the first recording layer L1 maintains almost the same values of jitter, I3/I14, asymmetry, and reflectivity regardless of the recording state or sequence while the second recording layer L2 exhibits varying characteristics depending on the recording sequence. That is, when data is written sequentially from the first recording layer L1 to the second recording layer L2, the second recording layer L2 suffers from large variations in jitter, asymmetry, and reflectivity. When data is written in the reverse order, the second recording layer L2 suffers from less variation in these characteristics.

Thus, to reduce variations in the recording/reproducing characteristics, data must be sequentially recorded from the first recording layer L1 to the second recording layer L2. Furthermore, data has been recorded on a region of the first recording layer L1 through which a recording beam passes before recording data on the second recording layer L2.

Table 2 shows recording/reproducing characteristics measured after data is written at recording powers that are 120% and 150% of the normal power. During OPC, a test is performed at different recording power levels to determine an optimum recording power value. In particular, since the information storage medium once used for a predetermined period of time may require recording power to be higher than normal power due to surface contamination, it is necessary to perform the test at higher power.

ing on whether a recording beam passes through a recorded or unrecorded portion of a recording layer. Low transmittance reduces the effect of recording power.

Meanwhile, it is necessary to perform a test under the conditions that cause great variations in recording/reproducing characteristics. That is, if there is little change in the recording/reproducing characteristics under any conditions, it is possible to find the accurate optimum recording power without any special test conditions for determining the same. However, if the recording/reproducing characteristics vary according to the recording conditions, a test needs to be performed under conditions that cause large variations in the characteristics in order to determine the optimum recording power.

Thus, when a test beam is emitted in order to find the optimum recording power, it is preferable that data has been written on at least a portion of a recording layer through which the test beam passes.

Referring to FIG. 1, an information storage medium according to the present invention includes a first recording layer L1 comprising a lead-in area 10-L1, a user data area 20-L1, and a lead-out area 30-L1, a second recording layer L2 comprising a lead-in area 10-L2, a user data area 20-L2, and a lead-out area 30-L2, and a space layer 15 interposed between the first and second recording layers L1 and L2. Before recording data or performing OPC on the second

TABLE 2

| Recording state | First recording layer (L1) | | | | Second recording layer (L2) | | | | Recording state |
|---|---|---|---|---|---|---|---|---|---|
| | Jitter | I3/I14 | Asymmetry | Reflectivity | Jitter | I3/I14 | Asymmetry | Reflectivity | |
| Recording L1 after recording L2 (120%) | 8.2% | 0.259 | 0.097 | 16.3% | 9.3% | 0.250 | 0.052 | 18.8% | Recording L2 after recording L1 (120%) |
| Recording L1 after recording L2 (150%) | 8.2% | 0.272 | 0.096 | 16.4% | 9.8% | 0.261 | 0.060 | 19.1% | Recording L2 after recording L1 (150%) |

As is evident from Table 2, while the first recording layer L1 exhibits almost the same recording/reproducing characteristics even at higher recording powers, the second recording layer L2 suffers from great variations in reflectivity, asymmetry, and jitter when data is written sequentially on the first and second recording layers L1 and L2. As compared against recording at normal power, the jitter increases but reflectivity and asymmetry remains almost constant.

As shown in Tables 1 and 2 above, the first recording layer L1 is little affected by recording sequence or recording power whereas the second recording layer L2 is significantly affected by the same. In particular, when data is written sequentially on the first and second recording layers L1 and L2, the second recording layer L2 suffers from great variations in the recording/reproducing characteristics. These variations result from transmittance that may change depending on whether a recording beam passes through a recorded or recording layer L2, data is recorded on a portion of the first recording layer L1 through which a recording or test beam passes.

Figure 2:
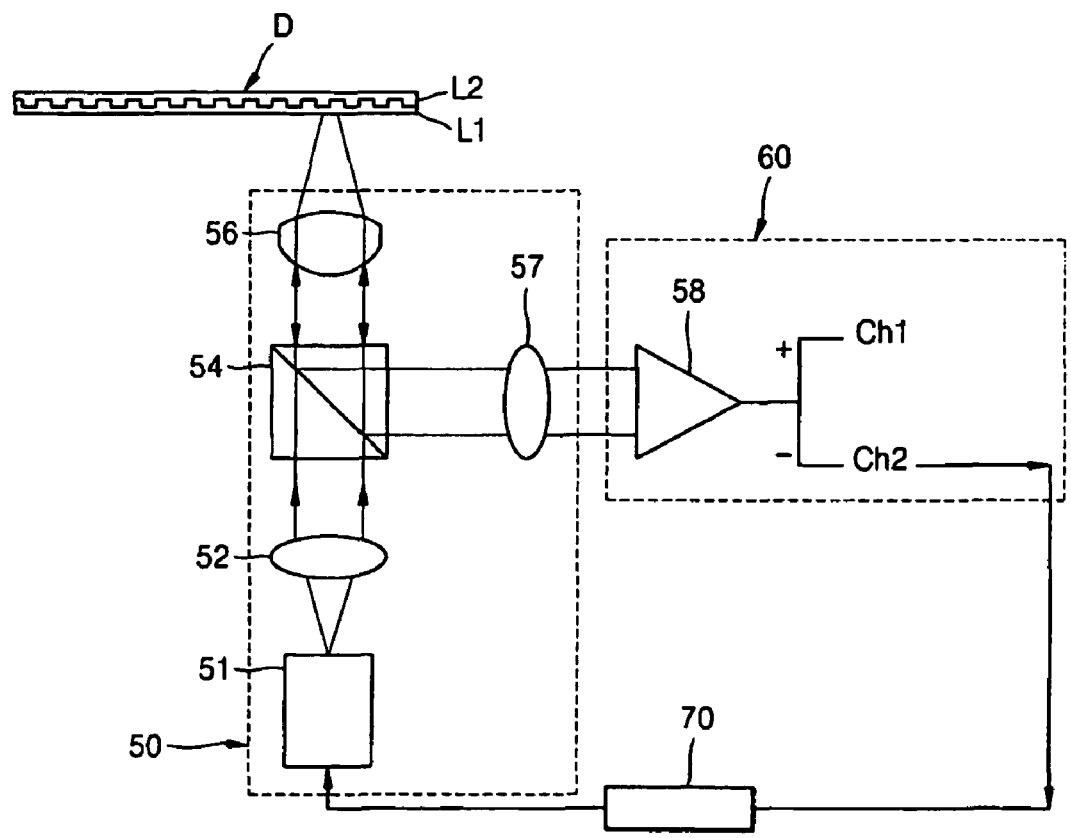
FIG. 2 is a schematic diagram of an apparatus for recording/reproducing data on/from an information storage medium according to an embodiment of the present invention.

Referring to FIG. 2, an information storage medium D includes first and second recording layers L1 and L2, and a pickup 50 for recording data is disposed adjacent the first recording layer L1. Before a recording beam or a test beam is irradiated in order to record data or perform OPC on the second recording layer L2, respectively, data is recorded on a portion of the first recording layer L1 through which the recording beam or the test beam passes. In this case, data may be recorded on tracks contained in the portion of the first recording layer L1 through which the recording beam or the test beam passes.

Referring to FIG. 1, a number of tracks on the first recording layer L1 irradiated by the test beam when recording on the second recording layer L2 is given by Equation (1):

$$\text{Number of Tracks} = \frac{2X}{TP} = \frac{2SL\tan\theta}{TP} \quad (1)$$

where X is one-half the diameter of test beam at the first recording layer, and Θ is one-half the included angle of the light beam as shown in FIG. 1, SL and TP denote the thickness of the space layer 15 between the first and second information storage layers L1 and L2 and a track pitch, respectively.

When n and NA denote a refractive index of the information storage medium and a numerical aperture of the objective lens 10, respectively, using relational expression NA=n sin θ, Equation (1) may be rewritten as Equation (2):

$$\text{Number of Tracks} = \frac{2SL\tan\left[\sin^{-1}\left(\frac{NA}{n}\right)\right]}{TP} \quad (2)$$

Data may be written on an area of the first recording layer L1 corresponding to the number of tracks defined by Equation (2) before irradiating the second recording layer L2 with a test beam for OPC or a recording beam. Where SL tan θ=41.25(μm) and TP=0.74 μm, the number of tracks contained in the recording beam or the test beam is about 112.

Figure 3:
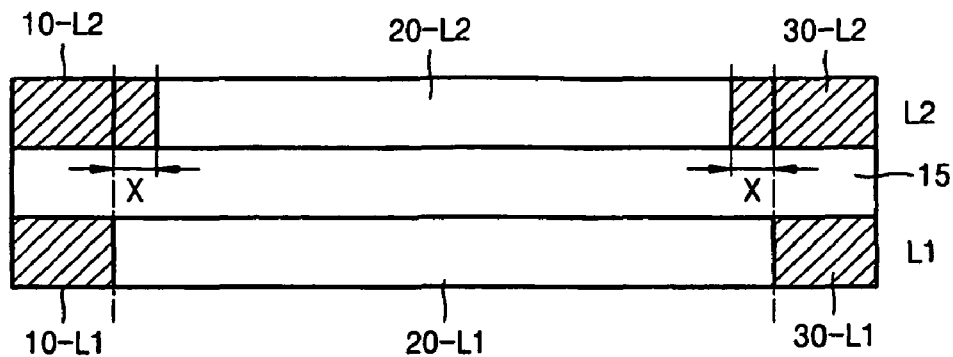
FIG. 3 illustrates a schematic layout of a dual layer information storage medium according to a first embodiment of the present invention.

Meanwhile, referring to FIG. 3, user data area 20-L2 may include unrecorded regions on the innermost and outermost circumferences, each region containing a number X of tracks affected by the first recording layer L1 when recording data on the second recording layer L2 as described above.

Thus, a recorded region in the user data area 20-L2 of the second recording layer L2 is smaller than that in the user data area 20-L1 of the first recording layer L1. More specifically, data are not recorded to regions containing X tracks on the inner and outer circumferences of the user data area 20-L2. The number X of tracks is given by Equation (3):

$$\text{Number of tracks corresponding to } X = \frac{SL\tan\left[\sin^{-1}\left(\frac{NA}{n}\right)\right]}{TP} \quad (3)$$

Thus, the number of tracks corresponding to X on the second recording layer L2 is one-half the number of tracks through which the light beam passes at the first recording layer. While FIG. 3 shows the dual layer information storage medium with the first and second recording layers L1 and L2, the same structure is applicable to an information storage medium having three or more recording layers.

Figure 4:
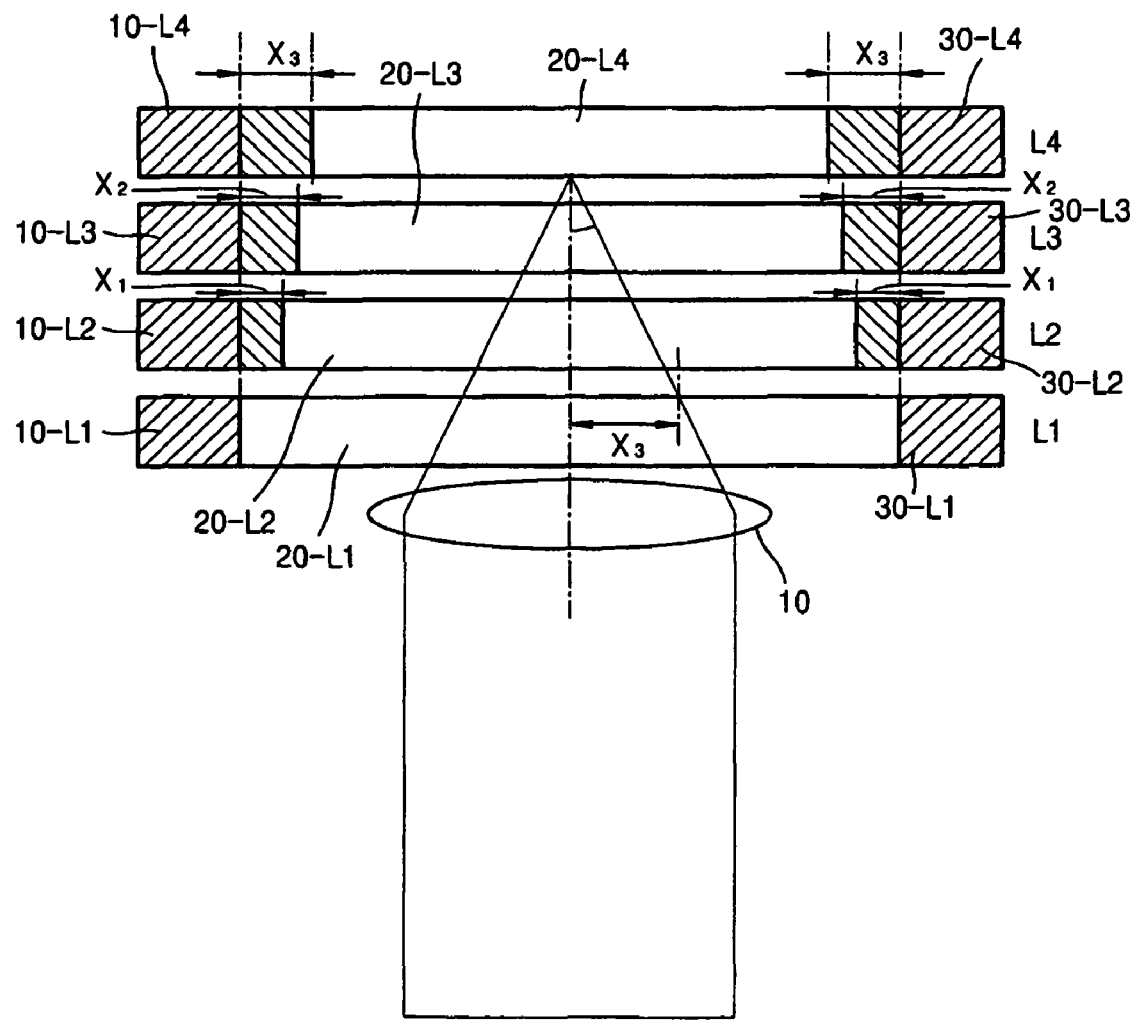
FIG. 4 illustrates a schematic layout of a quadruple layer information storage medium according to the first embodiment of the present invention.

Referring to FIG. 4, an information storage medium includes a first recording layer L1 comprising a lead-in area 10-L1, a user data area 20-L1, and a lead-out area 30-L1, a second recording layer L2 comprising a lead-in area 10-L2, a user data area 20-L2, and a lead-out area 30-L2, a third recording layer L3 comprising a lead-in area 10-L3, a user data area 20-L3, and a lead-out area 30-L3, and a fourth recording layer L4 comprising a lead-in area 10-L4, a user data area 20-L4, and a lead-out area 30-L4. Data are not recorded on regions located on the inner and outer circumferences of the user data areas 20-L2, 20-L3, and 20-L4, the regions containing X1, X2, and X3 tracks, respectively.

Here, the size of a recorded region in a user data area decreases as a recording layer is farther away from a surface on which a beam is incident. In other words, the size of an unrecorded region increases as a recording layer is farther away from the surface on which the beam is incident (X3>X2>X1).

While the size of a recorded region varies for each recording layer as described above, the size of recorded regions in user data areas of the remaining recording layers may be made equal to that in the user data area of a recording layer farthest away from the surface on which the recording beam is incident. For example, when data is not recorded on regions on the inner and outer circumferences of the user data area 20-L4 in the fourth recording layer L4, each region containing X3 tracks, data may not be recorded on regions located on the inner and outer circumferences of the second and third recording layers L2 and L3, each region containing X3 tracks.

Figure 5:
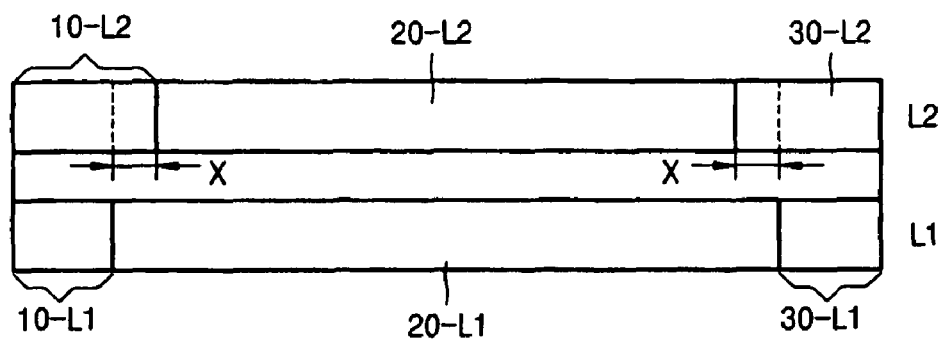
FIG. 5 illustrates a schematic layout of a dual layer information storage medium according to a second embodiment of the present invention.

FIG. 5 illustrates a schematic layout of a dual layer information storage medium according to a second embodiment of the present invention. Referring to FIG. 5, an information storage medium includes first and second recording layers L1 and L2, and the size of a recorded region in a user data area decreases as a recording layer is farther away from the surface on which a beam is incident. Furthermore, the sizes of a lead-in area and a lead-out area each increase as the recording layer is farther away from the surface on which a beam is incident. That is, when a recording beam or a test beam is incident first on the first recording layer L1, a user data area 20-L1 on the first recording layer L1 is larger than a user data area 20-L2 on the second recording layer L2, and a lead-in area 10-L1 and a lead-out area 30-L1 on the first recording layer L1 each are smaller than the counterparts 10-L2 and 30-L2 on the second recording layer L2. The user data area 20-L2 on the second recording layer L2 may be equal to the user data area 20-L1 on the first recording layer L1 minus areas corresponding to X on the inner and outer circumferences of the user data area 20-L2.

Figure 6:
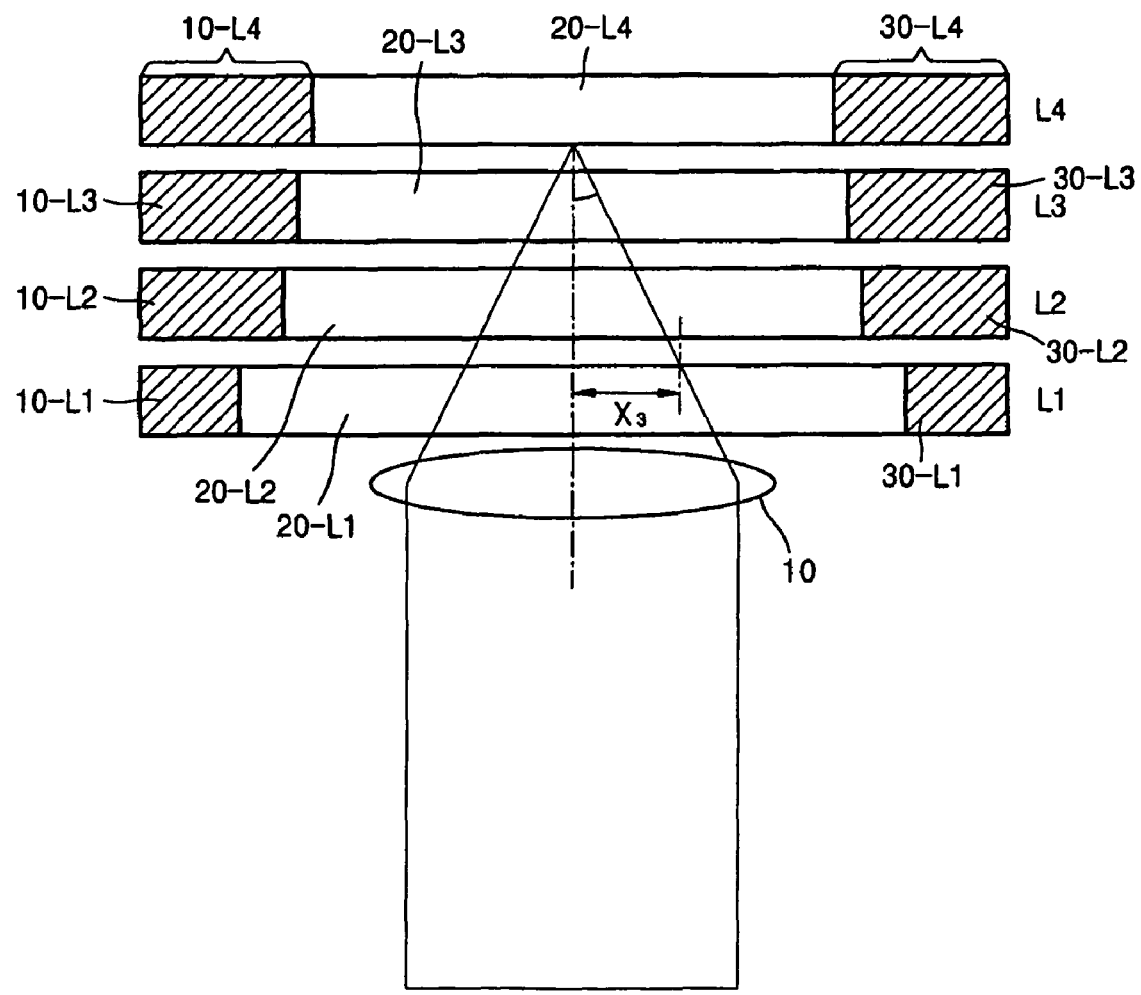
FIG. 6 illustrates a schematic layout of a quadruple layer information storage medium according to the second embodiment of the present invention.

The same structure is also applicable to an information storage medium having three or more recording layers. FIG. 6 illustrates a schematic layout of a quadruple layer information storage medium including first through fourth recording layers L1-L4 according to a second embodiment of the present invention. When a recording beam is first incident on the first recording layer L1, the size of a user data area decreases as a recording layer moves farther away from the surface on which the beam is incident (20-L1>20-L2>20-L3>20-L4) while the sizes of lead-in area and lead-out area each increase as a recording layer moves farther away from the same direction (10-L1<10-L2<10-L3<10-L4 and 30-L1<30-L2<30-L3<30-L4).

Figure 7A:
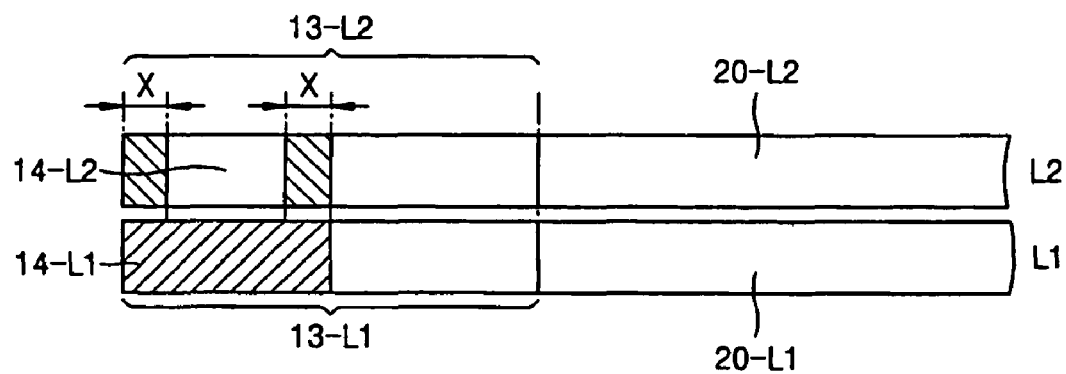
FIGS. 7A and 7B are layouts for explaining a method of performing a test on an information storage medium according to the present invention to determine optimum recording power.

Meanwhile, referring to FIG. 7A, first and second recording layers L1 and L2 respectively include OPC regions 13-L1 and 13-L2 in either or both lead-in and lead-out areas. Before performing OPC on a desired recording layer, data is recorded on at least a portion of a recording layer through which a test beam for finding optimum recording power passes.

A recorded region in an OPC area of a desired recording layer is smaller than that in an OPC area of the underlying recording layer. Referring to FIG. 7A, for example, a recorded region 14-L2 in the OPC area 13-L2 of the second recording layer L2 is smaller than a recorded region 14-L1 in the OPC area 13-L1 of the first recording layer L1. An unrecorded region in the OPC area 13-L2 corresponds to the number of tracks X (See Equation (3)) contained in a test beam.

Alternatively, the first and second recording layers L1 and L2 each may have OPC areas separately from a lead-in area and a lead-out area. For example, the OPC areas each may be located inside the lead-in area and outside the lead-out area.

Figure 7B:
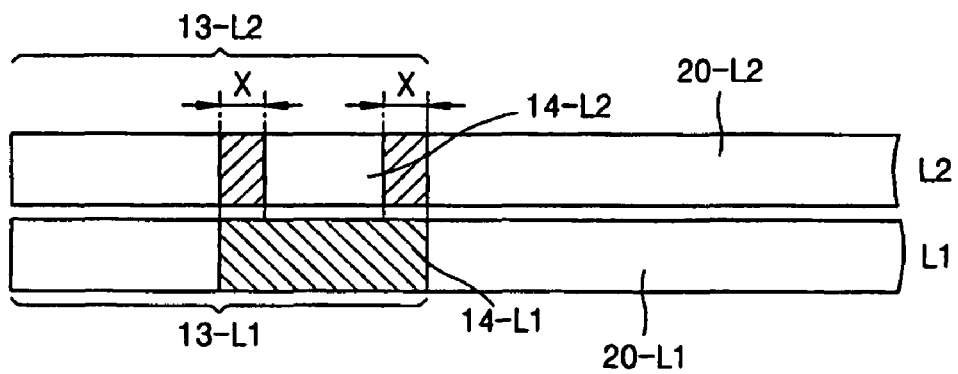

The location of a recorded region 14-L2 in an OPC area 13-L2 of a second recording layer L2 shown in FIG. 7B is different from that shown in FIG. 7A.

According to a method for recording/reproducing data on/from an information storage medium having a plurality of recording layers according to a preferred embodiment of the present invention, data is recorded using a pickup in the order of recording layers from closest to farthest from the pickup.

The size of a recorded region in a user data area decreases in the order of recording layers from closest to farthest from the pickup. Each recording layer also has a lead-in area and a lead-out area on the inner and outer circumferences of a user data area, respectively, whose sizes increase as the recording layer is farther away from the pickup.

Alternatively, data may be recorded on a user data area of a recording layer on which a recording beam is first incident and then on a user data area of an overlying recording layer except for the inner and outer circumferences. Thereby, the size of a recorded region in a user data area may decrease farther away from the recording layer on which the recording beam is first incident.

When performing an OPC test before recording user data, data for the test is recorded in the order of recording layers from closest to farthest from the pickup. Except for a recording layer closest to the pickup, data is not recorded on predetermined regions located on the inner and outer circumferences of an OPC area of the recording layer on which a write operation is about to begin. Therefore, the size of a recorded region in an OPC area decreases as a recording layer is farther away from the pickup.

In a DVD-ROM drive, a pickup is disposed adjacent a first recording layer and data is written from the first recording layer to the second recording layer. To maintain consistency with the DVD-ROM disk, the recordable information storage medium according to the present invention may be arranged to allow data to sequentially be recorded from the first recording layer L1 to the second recording layer L2.

The same method for recording/reproducing data according to the present invention is applicable when the pickup is located adjacent the second recording layer L2. That is, data is first recorded on the second recording layer L2. Before performing OPC for recording on the first recording layer L1, data is recorded on at least a portion of the second recording layer L2 through which a test beam passes.

Furthermore, the method is applicable to both opposite track path (OTP) and parallel track path (PTP) disks. While the present invention has been described with reference to a dual layer information storage medium, the method is applicable to a multi-layer medium having three or more recording layers.

Referring to FIG. 2, an apparatus (i.e., a disk drive) for recording/reproducing data on/from an information storage medium D according to an embodiment of the present invention includes a pickup 50, a recording/reproducing signal processor 60, and a controller 70. More specifically, the pickup 50 includes a laser diode 51 that emits a beam, a collimating lens 52 that collimates the beam emitted by the laser diode 51 to a parallel beam, a beam splitter 54 that changes the propagation path of an incident beam, and an objective lens 56 that focuses the beam passing through the beam splitter 54 onto the information storage medium D.

The beam reflected from the information storage medium D is reflected by the beam splitter 54 and is incident on the photodetector 57 (e.g. a quadrant photodetector). The beam received by the photodetector 57 is converted into an electrical signal by an operational circuit 58 and output as an RF or sum signal through channel Ch1 and as a push-pull signal through a differential signal channel Ch2.

The controller 70 controls the pickup 50 to record data and to reduce data area in the order of recording layers from closest to farthest from the pickup 50. Also, the controller 70 controls the pickup 50 not to record data on predetermined regions located on the inner and outer circumferences of a user data area of a recording layer on which data is being recorded except the recording layer closest to the pickup 50. Alternatively, the sizes of a lead-in area and a lead-out area may increase in the order of recording layers from closest to farthest from the pickup 50. Here, the size of an unrecorded region or a difference in the capacity of data to be recorded on a user data area between adjacent recording layers may correspond to the number X of tracks that passes over a recording beam as described above.

The controller 70 performs a test on a test area in the information storage medium D to determine the optimum recording power before recording on the information storage medium D having the first and second recording layers L1 and L2. The controller 70 also controls the pickup 50 not to record data on predetermined regions located on the inner and outer circumferences of an OPC area of a recording layer on which data is being recorded during OPC except for a recording layer on which data is recorded for the first time.

The controller 70 allows a recording beam to be irradiated from the pickup 50 at normal power obtained during the test, so that data may be recorded on the information storage medium D using the recording beam.

In order to reproduce the thus recorded data, a beam reflected from the information storage medium D passes through the objective lens 56 and the beam splitter 54 and is incident on the photodetector 57. The beam input to the photodetector 57 is then converted into an electrical signal by the operational circuit 58 and output as an RF signal.

A method and apparatus for recording/reproducing data on/from a recordable information storage medium with a plurality of recording layers according to the present invention prevent data from being recorded on the inner and outer circumferences of a user data area of each recording layer, thereby providing the same recording/reproducing characteristics across the entire user data area.

The present invention makes it possible to obtain the accurate optimum recording power by applying the same method in performing an OPC test. Furthermore, the present invention provides a recordable information storage medium designed to maintain consistency with DVD-ROM by allowing data to be recorded/reproduced in the order of recording layers from closest to farthest from a pickup.

Using the apparatus in recording/reproducing data on/from the recordable information storage medium improves the recording/reproducing performance of the information storage medium while making it possible to accurately perform a test to determine optimum recording power.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of reproducing data from an information storage medium using a pickup, the information storage medium comprising a plurality of recording layers, each of the recording layers comprising a user data area, the method comprising:

reproducing a first amount of data from one of the recording layers closest to the pickup; and reproducing lesser amounts of data than the first amount of data from other ones of the recording layers farther from the pickup than the recording layer closest to the pickup, the amount of data reproduced from each of the recording layers progressively decreasing from the recording layer closest to the pickup to one of the recording layers farthest from the pickup;

wherein the recording layers are the only recording layers in the information storage medium;

a region in which user data is not recorded is located on an inner circumference of a user data area of each of the recording layers;

a region in which user data is not recorded is located on an outer circumference of a user data area of each of the recording layers;

the region on the inner circumference of the user data area is the only region between the inner circumference of the user data area of each of the recording layers and an inner periphery of each of the recording layers;

the region on the outer circumference of the user data area is the only region between the outer circumference of the user data area of each of the recording layers and an outer periphery of each of the recording layers; and each of the region on the inner circumference of the user data area of one of the recording layers second closest to the pickup, and the region on the outer circumference of the user data area of the recording layer second closest to the pickup, corresponds to about a number of tracks determined according to the following equation:

$$\text{Number of tracks} = \frac{SL\tan\left[\sin^{-1}\left(\frac{NA}{n}\right)\right]}{TP}$$

where SL is a thickness of a spacer layer between adjacent ones of the recording layers, TP is a track pitch, NA is a numerical aperture of an objective lens in the pickup, and n is a refractive index of the information storage medium.

2. A method of reproducing data from a recordable information storage medium using a pickup, the recordable information storage medium comprising a plurality of recording layers, the recording layers comprising a first recording layer closest to the pickup and a second recording layer farther from the pickup, each of the recording layers comprising a user data area, the method comprising:

reproducing data from a recorded portion of the user data area of the first recording layer closest to the pickup and a recorded portion of the user data area of the second recording layer farther from the pickup;

wherein a difference between a size of a recordable portion of the user data area of the first recording layer and a size of a recordable portion of the user data area of the second recording layer is substantially equal to a number of tracks of the first recording layer through which a recording beam emitted from the pickup would pass to record information on the second recording layer;

the size of the recordable portion of the user data area of the second recording layer is smaller than the size of the recordable portion of the user data area of the first recording layer;

the first recording layer further comprises a first area located on an inner circumference of the user data area of the first recording layer, and a second area located on an outer circumference of the user data area of the first recording layer;

the second recording layer further comprises a third area located on an inner circumference of the user data area of the second recording layer, and a fourth area located on an outer circumference of the user data area of the second recording layer;

the first area is the only area between the inner circumference of the user data area of the first recording layer and an inner periphery of the first recording layer;

the second area is the only area between the outer circumference of the user data area of the first recording layer and an outer periphery of the first recording layer;

the third area is the only area between the inner circumference of the user data area of the second recording layer and an inner periphery of the second recording layer; and the fourth area is the only area between the outer circumference of the user data area of the second recording layer and an outer periphery of the second recording layer.

3. The method of reproducing data of claim 2, wherein the number of tracks of the first recording layer through which the recording beam would pass to record information on the second recording layer is determined according to the following equation:

$$\text{Number of tracks} = \frac{2SL\tan\left[\sin^{-1}\left(\frac{NA}{n}\right)\right]}{TP}$$

where SL is a spacing between the first recording layer and the second recording layer, NA is a numerical aperture of an objective lens in the pickup that focuses the recording beam on the first recording layer through the second recording layer, n is a refractive index of the recordable information storage medium, and TP is a track pitch of tracks on the first recording layer.

4. The method of reproducing data of claim 2, wherein the number of tracks of the first recording layer through which the recording beam would pass to record information on the second recording layer is a number of tracks of the first recording layer through which the recording beam would pass when the recording beam is focused at a point on the second recording layer.

5. A method of reproducing data from an information storage medium using a pickup, the information storage medium comprising a plurality of recording layers, each of the recording layers comprising a user data area, the method comprising:

reproducing a first amount of data from one of the recording layers closest to the pickup; and reproducing lesser amounts of data than the first amount of data from other ones of the recording layers farther from the pickup than the recording layer closest to the pickup, the amount of data reproduced from each of the recording layers progressively decreasing from the recording layer closest to the pickup to one of the recording layers farthest from the pickup;

wherein the recording layers are the only recording layers in the information storage medium;

a region in which user data is not recorded is located on an inner circumference of a user data area of each of the recording layers;

a region in which user data is not recorded is located on an outer circumference of a user data area of each of the recording layers;

the region on the inner circumference of the user data area is the only region between the inner circumference of the user data area of each of the recording layers and an inner periphery of each of the recording layers;

the region on the outer circumference of the user data area is the only region between the outer circumference of the user data area of each of the recording layers and an outer periphery of each of the recording layers; and a difference between sizes of the user data areas of adjacent ones of the recording layers corresponds to a difference between total sizes of the region on the inner circumference of the user data area and the region on the outer circumference of the user data area of the adjacent recording layers.

6. The method of reproducing data of claim 2, wherein the recordable portion of the user data area of the first recording layer extends between the first area of the first recording layer and the second area of the first recording layer; and the recordable portion of the user data area of the second recording layer extends between a point spaced away from the third area of the second recording layer by a distance substantially equal to half the number of tracks of the first recording layer through which the recording beam would pass to record information on the second recording layer, and a point spaced away from the fourth area of the second recording layer by a distance substantially equal to half the number of tracks of the first recording layer through which the recording beam would pass to record information on the second recording layer.

* * * * *